(No Model.) 2 Sheets—Sheet 1.

T. G. COOK.
SULKY HARROW.

No. 393,692. Patented Nov. 27, 1888.

Witnesses:
John Grist,
W. J. Lynch,

Inventor:
T. G. Cook,
By Henry Grist
Attorney.

(No Model.) 2 Sheets—Sheet 2.

T. G. COOK.
SULKY HARROW.

No. 393,692. Patented Nov. 27, 1888.

Witnesses:
John Grist.
W. J. Lynch.

Inventor:
T. G. Cook,
By Henry Grist
Attorney.

UNITED STATES PATENT OFFICE.

THOMAS G. COOK, OF BROCKVILLE, ONTARIO, CANADA, ASSIGNOR OF ONE-HALF TO JAMES A. PUBLOW, OF SAME PLACE.

SULKY-HARROW.

SPECIFICATION forming part of Letters Patent No. 393,692, dated November 27, 1888.

Application filed July 9, 1888. Serial No. 279,355. (No model.) Patented in Canada June 13, 1888, No. 29,351.

*To all whom it may concern:*

Be it known that I, THOMAS G. COOK, of Brockville, in the Province of Ontario, in the Dominion of Canada, have invented certain new and useful Improvements in Spring-Tooth Sulky-Harrows, (for which the J. W. Mann Manufacturing Company, (Limited,) of Brockville aforesaid, as my assignee, obtained a patent of the Dominion of Canada, numbered 29,351, and dated the 13th day of June, 1888;) and I do hereby declare that the following is a full, clear, and exact description of the same, reference being had to the accompanying drawings, in which—

Figure 1:
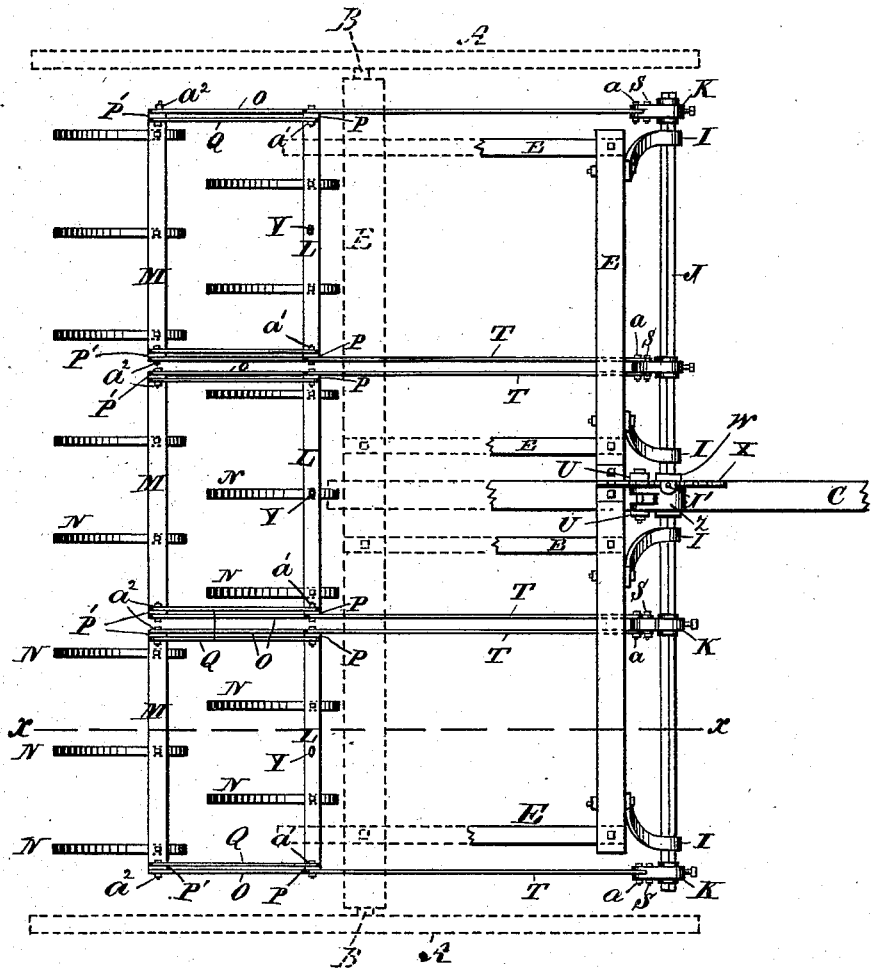
Figure 2:
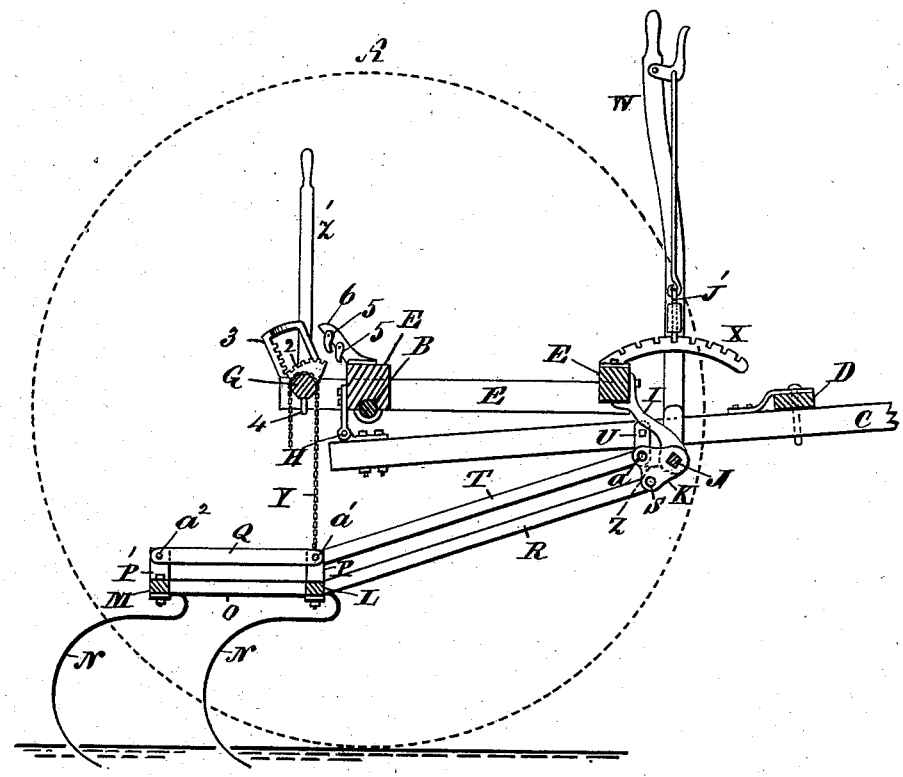

Figure 1 is a plan view of my improved sulky-harrow, the upper part broken away to show the harrow-sections and the draft mechanism below; and Fig. 2 is a section on line $xx$, Fig. 1, of my improved harrow complete.

My invention has for its object to allow the harrow-sections to have an independent movement to closely follow uneven ground and a connected tilting adjustment to set the points of the teeth backward or forward to cause greater or less penetration, and simultaneously by a tilting adjustment of the sulky-frame level the teeth, whereby all the teeth will have the same degree of penetration.

My invention consists in attaching the harrow-sections independently by parallel draft and adjustment bars to a rock-shaft journaled to the sulky-frame, whereby the sections will separately closely follow uneven ground, said shaft having a lever to rock the same to tilt the harrow-sections collectively to set the points of the teeth backward or forward to cause greater or less penetration in the soil, and in connecting the draft-pole to the sulky-frame and rock-shaft, whereby simultaneously with the tilting of the harrow-sections the sulky-frame will be adjusted to level the teeth, as hereinafter set forth.

A A represent the wheels of the sulky-frame; B, the axle; C, the draft-pole; D, the whiffle-tree, and E the sulky-frame carried by the axle. Each harrow-section consists of two or more parallel bars, L M, which carry the spring-teeth N, secured thereto in any suitable manner, and said bars are connected at the ends by a bar, O.

R are draft-bars forming a continuation of bars O, and each of said bars R is flexibly connected to a quadrant-shaped casting, K, sleeved on a rock-shaft, J, and rigid therewith. The rock-shaft is journaled in brackets I, bolted to the front bar of frame E.

T are adjustment-bars severally connected at one end to a casting, K, by a pintle, $a$, and the other end is pivoted to a post, P, at the ends of bar L by a pintle, $a'$, and post P is connected by a bar, Q, and pintles $a'$ $a^2$ to a post, P', at the ends of bar M of each harrow-section.

The rock-shaft J is provided with a lever, W, having a spring-bolt, J', which engages a quadrant-rack, X, secured to the sulky-frame. When the upper end of the lever is pulled inwardly toward the driver, the shaft will be rocked and the harrow-sections canted simultaneously to set the points of the spring-teeth N more forward to effect greater penetration in the ground; but when the lever is pushed in an opposite direction the points of the teeth will be set back and have less penetration, whereby the harrow can be suited to the nature or quality of the soil.

The draft-pole C is connected at the rear end by a hinge, H, to the rear bar of the sulky-frame and by straps U, flexibly bolted to the pole and pintled to a lug, Z, sleeved on rock-shaft J. By this connection of the sulky-frame E to the draft-pole by hinge H, brackets I, rock-shaft J, straps U, and lugs Z, the teeth of the harrow-sections will be leveled to penetrate to a uniform degree simultaneously with the forward or rearward adjustment of the points of the teeth to obtain the penetration desired by causing the front end of frame E to tilt downwardly whenever the lever W is pushed forward, and which movement causes the rock-shaft J to correspondingly drop toward the ground; but when the upper end of the lever W is drawn backward the sulky-frame E and rock-shaft J are correspondingly raised to effect leveling of the teeth according to the depth of penetration desired.

The rear ends of the harrow-sections are suspended in the usual manner to lift the harrow-teeth clear of the ground when not in use, and in the present case use is made of a rock-shaft, G, and chains Y, and said bar is provided with a lever, Z', and rack-quadrant 2, which meshes with a rack-frame, 3, secured to the side of frame E at the end of said bar, so that by pushing the top end of the lever toward the rear the quadrant will lift bar G in its bearings and correspondingly rotate to wind chain Y, thereby lifting the harrow-sections, and in such position they are held by a pin, 4, projecting from the rock-bar G, being brought into engagement with catch-pins 5, projecting from a rearwardly-inclined post, 6, secured to the rear transverse bar of frame E.

I claim as my invention—

1. The combination of the sulky-frame carrying a rock shaft, J, provided with a lever, W, and having quadrant-castings K sleeved thereon, draft-pole C, flexibly secured to said frame by hinge H and by straps U and lugs Z to said shaft, and the harrow sections independently connected to said castings by bars R T, posts P P', and bar Q, and hung from said frame E by chains Y, as set forth, whereby the harrow-sections will each have an independent movement to follow the inclination of the ground, and the harrow-sections combinedly tilted to effect greater or less penetration of the teeth, and the teeth leveled simultaneously with such tilting to have the same degree of penetration, as set forth.

2. The combination, with the sulky-frame provided with brackets I, of the rock-shaft J, provided with lever W, quadrant-castings K, sleeved thereon, draft-bars R, secured to said castings and to each harrow-section, adjustment-bars T, connected to said castings and to front posts, P, at the ends of the harrow-sections, and bars Q, connecting said posts P to rear posts, P', for tilting the harrow-sections, as set forth.

3. The combination of the sulky-frame and draft pole C, hinged together at the rear, the front of the frame provided with brackets I, carrying a rock shaft, J, and the draft-pole C, having straps U, pintled to a lug, Z, sleeved on said shaft for leveling the teeth simultaneously with the tilting of the harrow-sections, substantially as set forth.

THOMAS G. COOK.

Witnesses:
W. A. PUBLOW,
R. C. SHEPHERD.